United States Patent [19]

Meyer et al.

[11] 4,262,028
[45] Apr. 14, 1981

[54] COMPOSITION CONTAINING ANIMAL PARTS FOR PRODUCTION OF A FRIED SNACK FOOD AND METHOD FOR PRODUCTION THEREOF

[75] Inventors: Robert H. Meyer; Charles I. Graham; John E. Rudolph, all of Lima; Robert E. Haas, Findlay, all of Ohio

[73] Assignee: Beatrice Foods Co., Chicago, Ill.

[21] Appl. No.: 49,063

[22] Filed: Jun. 18, 1979

[51] Int. Cl.³ .............................................. A23L 1/31
[52] U.S. Cl. .................................... 426/417; 426/438; 426/445; 426/513; 426/641; 426/661; 426/808
[58] Field of Search ............... 426/618, 641, 417, 808, 426/661, 440, 448, 456, 516, 513, 438, 445

[56] References Cited

U.S. PATENT DOCUMENTS

| | | | |
|---|---|---|---|
| 3,769,029 | 10/1973 | Ganz | 426/618 |
| 4,119,742 | 10/1978 | Stupec | 426/516 |
| 4,140,803 | 2/1979 | Panchuk | 426/808 |
| 4,163,804 | 8/1979 | Meyer et al. | 426/417 |

*Primary Examiner*—Raymond N. Jones
*Assistant Examiner*—Elizabeth A. Hatcher
*Attorney, Agent, or Firm*—Murray and Whisenhunt

[57] ABSTRACT

A puffable food composition is provided by extruding a mixture of ground animal parts and starch whereby the mixture is at least partially gelatinized during extrusion into a shape-sustaining form. The form is puffed either at the die of the extruder, or in subsequent hot oil frying, or both. With added flavoring, the puffed composition has the taste, texture and mouth feel of fried pork skins. The process accommodates a wide variety of animal parts without the necessity of substantial changes in the process parameters.

32 Claims, No Drawings

COMPOSITION CONTAINING ANIMAL PARTS FOR PRODUCTION OF A FRIED SNACK FOOD AND METHOD FOR PRODUCTION THEREOF

The present invention relates to a puffable composition, which when approximately shaped and puffed, closely resembles conventional fried pork skins or other decorative shapes.

BACKGROUND OF THE INVENTION

Puffed fried pork skins have been a popular snack food for many years. These are prepared by cutting raw pork skins into pellets, rendering the pellets and deep-fat frying the pellets at high temperature until the pellets are puffed. The process suffers from several problems. It produces substantial quantities of small pieces of rendered pellets (called fines, balls and tails) which cannot be puffed into acceptable products and is therefore wasteful of the starting material. The rendering step is time-consuming, which substantially increases the cost of the product. The pellets, and correspondingly puffed product are of varying sizes and shapes, due to the difficulty in accurately cutting the rubbery raw (green) pork skins. This causes substantial difficulty in packaging the product in conventional film packages both in terms of processing and avoiding underweight or overweight packages. Further, since the varying sizes and shapes are puffed at the same temperature and for the same time (for practical manufacturing processes), non-uniform puffing may occur which can result in hard and brittle centers of the puffed product, toughness of the product and undesired texture of the product.

Accordingly, the art has sought to obviate these problems. Thus, U.S. Pat. No. 2,547,747 proposes to use bacon rinds instead of green skins. It is disclosed that the rinds may be used without a separate rendering step, when the rinds are steam-cooked. The cooked rinds are ground, extruded into strips, cut in appropriate sizes and deep-fat fried or baked.

Somewhat similarly, U.S. Pat. No. 2,562,580 suggests that a high pressure steam cooking be carried out until bacon rinds are gelatinized. Thereafter, the gelatinized rinds are pressed to remove remaining fat, formed into sheets, cut and deep-fat fried or baked.

In U.S. Pat. No. 2,947,635, the toughness often associated with some puffed pork skins is attributed to inadequate moisture removal in the frying step which results in the collapse of puffed cells in the fried skin. To avoid this difficulty, it is proposed that the frying include a differential pressure condition, e.g., the frying step is carried out in deep-fat maintained in a vacuum system.

On the other hand, U.S. Pat. No. 2,907,660 teaches that the texture difficulties are due to varying moisture contents of the pork skins (including bacon rinds and green skins). The patent suggests heating the skins in hot oil until all visible vapor is removed and then further heating the skins in that oil under pressurized conditions of up to 20 psi. That intermediate product is said to be uniform in moisture content and will produce uniform puffed skins.

In U.S. Pat. No. 3,401,045, a process is described where raw (green) skins are cut and rendered in fat at higher temperatures for extended periods of time, i.e., until the green skins are cooked and are reduced in size to about one half of the original size. These relatively hard, dry and tough pieces are then soaked in an aqueous flavoring solution, dried to a prescribed moisture content and puffed by deep-fat frying.

A similar idea is stated in U.S. Pat. No. 3,428,462, which proposes low-renderiing temperatures for initially cooking green skins, with increasing temperatures and the repeated addition of water to the heated fat vessel (the temperature of which must be very low) until the green skins are fully cooked. The cooked skins are puffed at higher temperatures in the latter portions of the process. This is said to supply the necessary moisture for the skins and avoid the difficulty of hard and impalatable product.

In U.S. Pat. No. 4,119,742, a process is disclosed wherein certain of the above noted problems are obviated in that the process uses a starting material which is particles of animal parts which are sufficiently high in collagen content to cause gelatinization thereof and at least 50% by weight thereof are rendered parts. In a particular form of the process, the "balls, tails and fines" (identified above) are used as the starting materials. These particles are moisturized and gelatinized in a screw-type extruder having thermally controlled barrel sections to produce an extrudate which is smooth, glossy and does not exhibit reversion characteristics (will not revert to an agglomerization of particulate material at room temperature). That extrudate is cooled, cut, dried, and deep-fat fried to produce a puffed product which closely resembles a conventional fried pork skin in taste, appearance, texture and mouth feel. This process provides a substantial advance in the art, particularly in that the sizes and shapes of the extruded and cut material are substantially uniform and a uniform puffing can be achieved. This avoids difficulties in packaging and in regard to hard centers of the puffed product. Additionally, it recovers the otherwise waste "balls, fines and tails" which accumulate in the rendering tanks.

The process of that patent, however, does require rendered starting material (at least 50% of the animal parts must be rendered) and, thus, does suffer from the disadvantage noted above in connection with the rendering step.

In copending U.S. Ser. No. 876,124, filed Feb. 8, 1978 now U.S. Pat. No. 4,163,804, a method is disclosed for producing a puffable composition derived from animal parts wherein substantially raw animal parts and dried to moisture contents between 10% and 25% and comminuted to particle sizes of no greater than one quarter inch. These particles are mechanically defatted and fed to an extruder where they are mascerated, and placed under sufficient temperature and pressure to cause gelatinization of the particles to form a thermoplastic moldable mass. The mass is extruded into a shape-sustaining form, cooled and cut into puffable pellets. The so-produced pellets may then be puffed in hot oil to at least twice the unpuffed volume of the pellets. Alternatively, the pellets may be thermoformed into a decorative shape, e.g., a chewable dog bone.

Thus, that process produces a puffable composition derived from animal parts wherein the necessity of a conventional rendering step is avoided, along with the attendant disadvantages thereof. Further, that process may utilize a wide range of animal parts, and is not restricted to pork skins and the varying availablity thereof. That process may also be carried out with increased mechanization, which, importantly, eliminates some of the manual aspects and inspections required for the conventional process for producing puffed pork skins.

Therefore, the process of that copending application provides very important advantages to the art, not only in the more advantageous use of raw animal parts, but in the variability of animal parts used by the process. However, even this process is limited to the use of animal parts for producing the composition from which the puffed snack food may be obtained. While the animal parts used for that process may vary widely, the availability of animal parts can change from time to time. Under the circumstances, as readily available animal parts change, process parameters, e.g., moisture, fat content, etc., must be adjusted to accommodate the varying feed materials. Additionally, due to increasing cost in the production of animals, the cost of traditionally used pork skins and also the cost of other edible animal parts have increased. Under the circumstances, it would be of considerable advantage to the art to minimize the required adjustments of process parameters in utilizing different animal parts in the process of the copending application. Further, it would be of substantial economic advantage to the art to provide means wherein a puffable composition can be obtained with feed materials which costs less than pork skins or other animal parts but wherein the required adjustment of process parameters are yet minimized.

OBJECTS OF THE INVENTION

It is therefore an object of the invention to provide an improvement of the process of the said copending application, wherein the processing parameters require fewer adjustments to accommodate varying animal parts fed to the process. It is another object of the invention to provide feed materials for the process which are less expensive than animal parts. It is a further object of the invention to provide a puffable composition made by the present process and with feed materials which include other than animal parts, but where the puffable composition, nevertheless, closely resembles traditional puffed fried pork skins in taste, texture, mouth feel and appearance. Finally, it is an object of the invention to provide a puffable or puffed composition which may be converted into a fully puffed form with significantly less subsequent frying than was previously required. Other objects will be apparent from the following description of the invention and the claims.

BRIEF DESCRIPTION OF THE INVENTION

The present invention is based on several primary discoveries. The first discovery is that while a simulated puffed fried pork skin produced according to the process of the said copending application duplicates the texture, mouth feel and taste of a conventionally produced puffed fried pork skin, the flavor, mouth feel, texture and taste thereof is not substantially reduced when combined with a relatively bland non-animal food, i.e. a starch. Since starch is considerably less expensive than animal parts, this allows the production of a simulated puffed fried pork skin at a substantially reduced cost, as opposed to the cost of the simulated fried pork skin of the said copending application. This is, of course, a considerable economic advantage.

The second basic discovery which gives rise to the present invention is that the starch can also be gelatinized and thus use in the process for producing the simulated fried skins, according to the said copending application, and therefore does not disrupt the overall texture of the resulting combination of animal parts and starch. Stated another way, starch is a unique non-animal component in this regard, since its gelatinization properties are similar to the gelatinization properties of animal parts, and the resulting simulated fried pork skin has the essential texture and mouth feel of a simulated fried pork skin produced entirely from animal parts. Further, in view of the bland taste of the starch and the usual excess of flavor associated with simulated puffed pork skins, according to the said copending application, very substantial amounts of starch can be included in the present simulated fried pork skins without seriously depleting the flavor of the resulting product.

A third important discovery is that with the inclusion of the starch, the parameters for effecting the necessary gelatinization of the product can be considerably extended, as compared to the parameters which must be observed when gelatinizing all animal parts. As can be appreciated from the disclosure in the said copending application, it is necessary to effect substantial gelatinization of the animal parts, while at the same time, avoiding substantial denaturization of the animal parts. To achieve this result, relatively close control of particle size, moisture content, fat content and gelatinization temperatures must be observed. With the inclusion of starch, which will gelatinize over a wider range of these parameters, and especially at lower temperatures and with less criticality of moisture content, effective overall gelatinization of the product can be achieved with much greater latitude of these parameters. Thus, as opposed to the process of the said copending application, these parameters need not be carefully adjusted for each change in the particular animal parts fed to the process. With the inclusion of starch, the process parameters may remain essentially unchanged or changed to lesser degrees even when accommodating a wide variety of different animal parts, as economic considerations may prudently dictate.

As a subsidiary feature of the foregoing discovery, but nevertheless an important feature, it has also been discovered that with the inclusion of starch, it is possible to obtain puffing of the composition as it exits of extruder. This prepuffing was not achievable by the process of the said copending application, since effective puffing, i.e. increase in volume, for animal parts, occurs only at higher temperatures than those allowable in the extruder, bearing in mind that the protein of the animal parts should not be substantially denatured. This prepuffing at the exit of the extruder allows the product to be fully puffed in a subsequent frying step which can be operated at lower temperatures and requires substantially less frying time. This prepuffing, however, need not be carried out, and if desired, the extrudate can be in unpuffed pellet form, according to the process of the said copending application, simply by adjusting conventional extruder parameters.

Accordingly, briefly stated, the present invention is an improvement over the method for producing a puffable composition containing animal parts wherein that method comprises providing dried animal parts, defatting the dried animal parts to a reduced fat content, parts passing the defatted animal parts through an extruder at sufficiently elevated temperatures and pressures to form a moldable mass, extruding the moldable mass into an extruded shape-sustaining form and cutting the form into portions thereof. The present improvement over that process comprises admixing a starch with the said animal parts, prior to said extruding step, maintaining the extruder at a temperature where the starch or the starch and animal parts are at least partially gelatinized, and cutting the extruded form into portions thereof, and wherein the mixture fed to the extruder has a moisture content between 10% and 35%, a fat content of less than 15% and the weight percent of said starch, based on the mixture of animal parts and starch is up to 75%.

With the present process, the temperature of the mixture in the extruder can be as low as the minimum gelatinization temperatures of the starch and yet achieve satisfactory gelatinization of the extrudate. This considerably extends the acceptable temperature range of the process, as opposed to the copending application. Usually, this temperature will be at least 210° F. Further, the starch may be selected from a wide variety of starches, including ecomomical wheat and corn starch, and mixtures thereof. Thus, the process may take advantage of current economic availabilities of the various starches, since the process is not narrowly limited to certain starches.

Similarly, the invention provides an at least partially puffed or a puffable composition comprising a shape-sustaining form of particles of defatted animal parts and a starch, wherein the composition is in at least partially gelatinized form, the moisture content thereof being less than 13%, the fat content thereof being less than 15%, and the protein being substantially undenatures. In this composition, it is possible that only the starch is gelatinized, but preferably, there is at least partial gelatization of both the starch and animal parts.

DETAILED DESCRIPTION OF THE INVENTION

As noted above, the basic overall process is that of the said copending application, but wherein that process is modified according to the present invention which not only allows more economical feeds to the process, but provides for a wider range of operating parameters. Thus, for sake of conciseness, the details of the process of that said copending application will not be repeated herein, and the entire disclosure of that said copending application is incorporated herein by reference and relied upon for disclosure.

However, briefly stated, the process of the said copending application requires drying raw animal parts to a relatively low moisture content, comminuting those animal parts to a relatively small particle size, mechanically defatting the animal particles to a reduced fat content under conditions where the animal parts are not substantially denatured, mascerating the animal parts in an extruder at elevated temperatures and pressures sufficient to cause gelatinization of the animal particles to form a moldable mass, extruding the moldable mass into shape-sustaining forms, and cutting the extrudate into pellets.

It should be appreciated, however, that the present process is not limited to the use of only raw animal parts. In the copending application, it is disclosed that the animal parts may contain no more than 25% hot oil rendered parts in order to avoid problems in gelatinization of the animal parts. In this connection, the term "hot oil rendered" is the same as the conventional usage, i.e., where moisture and fat have been removed from the animal parts by subjecting the parts to oil at temperatures between 212° F. and 350° F. for at least one half hour, e.g., at least one hour. However, since in the present invention provides for substantial gelatinization by way of the starch, this problem does not occur with the present process. Thus, as opposed to the process of the copending application, if desired, the animal parts may all be rendered, or any portion thereof may be rendered.

The animal parts may be chosen from a wide variety of high collagen content animal parts. It will be appreciated, as briefly noted above, that gelatinization must take place to produce the moldable mass and to this end substantial amounts of undenatured collagen are desired. Hence, the animal parts preferably are conventional green pork skins, in part rendered pork skins (as noted above), bacon or ham rinds, connective tissue, cartilage (such as derived from snouts, ears, hooves, etc.), and intestinal tract tissue. Other selected animal parts may be low in collagen and it is only necessary that the total mixture of animal parts have a relatively high average collagen content. The absolute collagen content may vary considerably, depending upon the specific source of the animal parts, so long as the content is sufficiently high to cause gelatinization, in combination with the starch, to the extent that a moldable mass may be achieved, as explained hereinafter more fully.

Traditional "pork skins" are taken from pork bellies, hams and backs, but, with the present process, any animal skin may be used, either bovine or non-bovine. Indeed, the starting material may contain fowl skin, e.g., chickens and turkeys, or beef skin or skin from parts of pigs other than the bellies, hams and backs, e.g., the head skin, the shoulder skin and the like. It is, however, preferred that the process be carried out with traditional pork belly, ham and back skin, i.e., green skins, rendered skins, bacon and ham rinds, with the above noted limitations as to the rendered skins. More preferably, the starting material is conventional green skins, since these are the most readily available starting materials for most time periods and provide an excellent end product.

The starting materials is normally dried, since the substantially raw animal parts will have a relatively high moisture content; the moisture must be reduced to a level consistent with further processing. The drying may be by hot oil drying, as opposed to the requirements of the copending application, since the inclusion of starch can provide the presently required gelatinization. However, since hot oil drying can rapidly cause denaturization of the protein in the starting material and decrease the desired gelatinization of the starch/animal parts mixture, this is not preferred. Accordingly, conventional air/smoke oven drying is preferred. In this conventional process the animal parts are simply tumbled in the oven dryer until sufficient moisture has been removed therefrom. If the animal parts are in the form of green skins, it is desirable to cut the skins into smaller sizes for the convenience of drying, although this is not critical. Generally, sizes having dimensions no greater than about 2 to 3 inches, e.g., no greater than about one half inches are preferred. If desired, prior to drying, the skins may be comminuted to a size consistent with the requirement for extruding, but this tends to complicate the drying process in that the smaller sizes are not readily amenable to conventional oven dryers and comminuting the green skins to these smaller sizes is more difficult, due to the rubbery nature of the green skins and like animal parts.

In the process of the copending application, the moisture content during drying must be reduced to less than 25%. However, in the present process, a higher moisture content may be used. Indeed, it is only necessary that the moisture content of the animal parts by sufficiently reduced that the mixture of animal parts and starch fed to the extruder be less than 35%.

The drying temperatures, e.g., air, smoke or the like, preferably will not cause substantial denaturization of the protein. Thus, drying temperatures will normally not exceed 300° F. and temperatures between 212° F. and 275° F. are preferred. At temperatures beyond 300° F. undersirable amounts of protein denaturization can take place, especially with longer drying times.

If desired, conventional flavorings may be added during the drying step. Conventional amounts of salt, pepper and other spices may also be added at this time.

The drying time is not critical so long as the drying temperatures and ultimate moisture contents noted above are observed. Ideally, however, the drying time will be less than five hours, e.g., about three hours or less, and will achieve a moisture content of the dried animal parts in the range indicated above.

After appropriate drying, preferably the animal parts are comminuted to a size consistent with ease of mascerating in conventional extruders. For ease of effecting gelatinization and forming the molable mass, the particle size of the comminuted animal parts preferably will be no greater than one quarter inch, although it is more preferred that the particle size be one sixteenth of an inch or less, e.g., one thirty-second of an inch or less.

While it is not necessary for extrusion purposes, when the ultimate product is intended for human consumption, it is preferred that the particles actually be ground by conventional means to very small particle sizes. This will ensure that any pieces of bone or the like hard material associated with the animal parts will have been reduced to a particle size which will not cause difficulty in masticating the ultimate product. Any conventional grinding device is acceptable in this regard, but particularly useful are the rotary grinding devices such as an Urschel·Comitrol TM. These devices will reduce the particle size to less than one-sixty fourth of an inch and therefore will avoid any difficulties with bone and the like in the final product.

Particularly when the dried material is to be ground, it is preferred that the dried material be cooled prior to comminuting. The warmer material tends to increase the greasing-out on comminuting and grinding devices. Therefore, in a preferred form of the invention, the dried material is cooled to below at least 150° F. prior to comminuting, especially to below 100° F. This cooling is, however, not critical.

The animal parts must be reduced in fat content in order to accomplish sufficient gelatinization in the extruder. According to the copending application, it was necessary that the defatting step be by mechanical defatting, rather than by the hot oil rendering and the like, at least within the limits noted above in order to avoid undesired denaturization of the protein in the animal parts. Since the present starch can effect adequate gelatinization, the adverse effects on gelatinization by denatured protein is minimized and, hence, hot oil rendered parts may be used, either as part of the animal parts feeds or all thereof. However, for the same reasons expressed in the copending application, it is preferred to not use hot oil rendered parts, at least not more than 25% thereof, and mechanical rendering is preferred.

The mechanical defatting step is carried out by way of rollers, presses, extruders, worms, gears and the like. A particularly advantageous method of mechanically defatting is that of grinding the animal parts to a relatively small particle size, e.g., consistent with human consumption as noted above, and centrifuging the ground parts to remove the fat. A conventional basket type centrifuge is quite acceptable for this purpose, although the ground animal parts must be contained within a conventional centrifuge bag, e.g., a Dacron TM centrifuge bag, in order that the ground parts will not be lost through the perforated basket of the centrifuge. Conveniently, a conventional Bock TM basket-centrifuge is acceptable for this purpose. Indeed, any of the conventional centrifuges may be used so long as at least 300 g's, and preferably at least 500 g's, are generated on the ground particles in order to accomplish sufficient defatting thereof.

The fat content of the starch/animal parts mixture, prior to extruding, will be similar to that of the copending application, i.e., below 18% and most preferably 15% of less. However, since the defatted animal parts are mixed with relatively large amounts of starch, i.e., up to 75%, the amount of fat which must be removed from the animal parts can be considerably less than that required by the process of the copending application, and yet reach a starch/animal parts mixture fat content within that range.

Prior to or after mixing the defatted animal parts with the starch, an adjustment of the moisture content may or may not be necessary. Adequate extrusion of the mixture of animal parts and starch will take place with moisture contents between 10% and 35%, although more specific moisture contents for screw and grinder type extruders are preferred, as noted below. If the moisture content is less than about 10%, moisturization may be achieved by simply adding water, preferably a fine stream or mist, while agitating the defatted animal parts or mixture with the starch. That moisture will be absorbed, similar to the operation described in the said copending application. Indeed, if desired, the moisture may be added prior to the defatting step, although this is not preferred, since some of that moisture will be lost during the mechanical defatting step and additional compensating moisture or further moisturization may be required.

It is an important advantage of the present invention that the extruder may be of any desired type, e.g., screw type, grinding type, transfer type and combinations thereof. The preferred extruders are of the screw type and the grinding type. A screw-type extruder has a relatively long barrel with independently heated sections, e.g., heated by electrical heaters, oil heaters, steam heaters, water heaters, etc. The screw has different sections along its length for feeding, grinding, compression, etc. The grinding type extruders have high shear screw flights which mascerate in essentially unheated or heated single section barrels of relatively short length. These extruders have, usually, relatively short screws of essentially uniform flights which function both to feed, mascerate and pressurize. The grinding-type extruder provides greater ease of operation and is therefore a preferred form of the invention. For screw-type extruders, the preferred moisture content of the mixture of animal particles and starch is between 25 and 35%, e.g., 26-30% and for the grinding-type extruder, the preferred moisture content is between 11 and 15%, e.g., about 13%.

Irrespective of the particular extruder used, the temperatures used in the extruder should be sufficiently high to cause gelatinization of at least the ungelatinized starch, e.g., about 210° F., but below those temperatures which will cause substantial denaturization of the protein, i.e., temperatures no greater than about 330° F. This latter temperature, however, is not so narrowly critical in the grinding type extruder, since the residence time therein is quite low and the amount of denaturization even at higher temperatures will be within acceptable limits. In that type of extruder temperatures up to as high as about 350° F. may be used, although it is preferred that the temperature remain below 300° F. for both extruders.

Preferably the extruder will sufficiently mascerate the animal parts and cause sufficient pressure thereon that substantial gelatinization of the substantially undenatured protein takes place, in addition to the gelatinization of the starch. The product exiting the extruder will be moldable, e.g., thermoplastic. Thus, if the product exiting the extruder can be molded at elevated temperatures and pressures, then sufficient gelatinization has been achieved. If the product is not moldable, then insufficient gelatinization took place. Insufficient gelatinization can occur by virtue of insufficient masceration during extrusion or by excessive denaturization of the protein during earlier processing or during extrusion, e.g., excessive temperature or residence time in the extruder, although this latter source of denaturization occurs only in extreme cases of residence times. In any event, the correct product can be determined by virtue of its being moldable. The term "moldable" in this regard means that the extrudate may be thermo-molded to a shape-sustaining form at temperatures of about 210° F. or above.

The product exiting the extruder may take a variety of shapes, including flat ribbons suitable for subsequent cutting to produce the simulated puffed pork skin snack food. Alternatively, other shapes may be prepared, e.g. annular shapes to ultimately produce a puffed ring snack food. When a flat ribbon shape is extruded through the extruder die to produce a puffed pork skin snack food, while not necessary, the extrudate may be stretched by a radio of at least 2:1 after the extrudate exits the die and preferably before the extrudate has cooled substantially below extrusion temperatures. This stretching tends to give a more uniform flat ribbon, both in terms of cross sectional dimensions and in terms of product uniformity. Stretch ratios are great as 5:1 may be used, but more usually the stretch ratio will be approximately 2:1 to 3:1.

After extruding, the extrudate may be cooled, although this is not necessary, in order to facilitate cutting. Cooling to temperatures below 215° F. will ensure sufficient setting of the extrudate that cutting with conventional knives, e.g., rotating discs and knives and the like, may be easily accomplished. Preferably this temperature is below 160° F.

The cut portion of the extrudate are preferably equilibrated by lagging (resting) at convenient temperatures and humidity so that the moisture content thereof will become uniform therethrough. This is particularly true if the cut portions are subsequently dried to a lower moisture content prior to puffing. The optimum moisture content of the cut portions for puffing is between 7 and 13%, especially between 9 and 11%. Moisture will be lost during the extruding step, and if lower moisture contents are used in the mixture fed to the extruder, then a drying step of the cut portions may not be required. Again, the drying step is preferably by hot air oven drying at temperatures below 240° F., although since the moldable mass has been formed, hot oil drying at those temperatures may be used if desired.

The cut portions are then ready for frying in hot fat at 325° F. to 410° F. ("fat" is defined to include all edible animal and vegetable fats and oils that are liquid at the foregoing temperatures). Below 325° F., the frying time is excessive, while above 410° F. scorching of the product may occur. More preferably, the temperature of the deep-fat frying will be between about 365° F. and 400° F., with an optimum temperature of about 400° F. With this temperature, the drying step may be accomplished in as little as about 5 seconds, although frying times up to 3 minutes or more may be used. Generally speaking, however, 10 seconds to about one and one half minutes will be sufficient frying time, with an optimum result at about 45 seconds. In any event, the frying step should reduce the moisture content of the puffed pellets to at least less than 5% by weight, especially 3 or 2.5% or less. Otherwise, the brittle and "crackling" characteristics may not be obtained. The drying step will also puff the unpuffed portions, e.g., to at least double the volume of the unpuffed portions, and more preferably, at least triple the volume of the unpuffed portions. This will ensure the light and friable characteristic associted with deep-fat fried pork skins.

By the addition of a proper coloring agent, either prior to, during or after the frying step, the fried product will have the color and texture of a puffed pork skin. With the addition of salt, i.e., up to 3% by weight, the correct flavor will be obtained. Thus, the total overall appearance, mouth feel and taste will be very similar to conventionally deep-fat fried pork skins, and the product may be accurately characterized as a reformed fried and puffed pork skin.

Flavoring may, however, be added at any step of the process, e.g., the moisturized particles may be treated with smoke, or smoked salt may be used in lieu of natural salt. If dried, the smoke treatment may be carried out during the drying of the cut portions. Hot smoke at about 200° F. is acceptable in this regard.

Alternatively, flavoring agents may be added during the extruding step. This is particularly effective when the flavoring agent is added so that the flavoring agent is worked into the material during gelatinization thereof. A suitable extruder for carrying out this embodiment of the invention is disclosed in U.S. Pat. No. 2,915,957, which disclosure is incorporated herein by reference.

The moldable mass may be directly molded into a decorative shape. Preferably, as the extrudate exits the extruder it is directly shaped into the decorative shape. Thus, the extrudate may be fed directly to a molding device, e.g., compression or vacuum molding machine. Molding temperatures may be the same as extruding temperatures, e.g., between 210° F. and 325° F. The decorative shape may take any form desired. As an example, the moldable composition may be compression molded or extrusion molded into the shape of a dog bone. Additionally, a novelty shape may be molded and subsequently puffed for human consumption. Thus, shapes of the suits of playing cards, e.g., clubs, diamonds, spades and hearts may be molded and puffed for a novelty snack food. Animals and comic shapes may be molded and puffed for novelty juvenile snack foods. Other similar moldings and shapes will be readily apparent to those skilled in the art.

Irrespective of the subsequent processing, the composition which exits the extruder is a composition in a shape-sustaining form. The composition is at least partially gelatinized particles of animal parts and starch, the moisture content thereof must be less than 13% or otherwise drying to that moisture level is required, prior to puffing in hot oil. The fat content will be less tha 15%. The composition is moldable, as noted above, and may be shaped into a form suitable for puffing to simulate the natural puffed pork skin, e.g., will have a puffed volume at least twice the unpuffed volume. Alternatively, the composition may be shaped into a shape-sustaining form which is a decorative thermoformed shape. In this regard, the term "thermo-formed" means that it is moldable in the thermoplastic state by conventional molding and extruding techniques, as described above.

As noted above, the starch is admixed with the animal parts or particles prior to the extruding step. Preferably, the starch is admixed with the defatted animal particles just prior to feeding to the extruder, although the starch may be added at an earlier step in the process. For example, the starch may be admixed with the comminuted dried animal particles, and this mixture then defatted in the same manner. However, if substantial fat must be removed, it is preferable to remove that fat prior to admixing with the starch.

The starch could even be added to the raw animal parts, but when these parts include substantial moisture, the starch can be rather quickly hydrated and will complicate further processing. Accordingly, this is not a preferred form of the process for adding the starch.

Irrespective of the step in the process where the starch is added, prior to introducing the mixture of animal particles and starch to the extruder, the moisture content of the resulting mixture must still be between the 10% and 35%, based on the weight of the mixture of animal parts and starch. This is considerably wider range of moisture content than is acceptable according to the said copending application, and allows for extrusion of varied animal parts without adjusting this parameter. This moisture range may require the addition of moisture to the mixture. Since dry animal particles are easier to mix, e.g., with the starch and other ingredients, it is convenient to dry the animal parts to a relatively low moisture content, e.g., 10–20% and after mixing with starch and the other ingredients, additional moisture is added to reach the desired level.

While the weight percent of the starch, based on the mixture of animal parts and starch may be up to 75%, it is preferred that the percentage is no more than 65%, e.g., up to 55%. About 50% is an optimum level both from taste, texture, mouth feel and economic points of view. On the other hand, the starch percentage can be quite low, but from an economic point of view, the admixture with the animal particles should be at least 10%, or otherwise the economic advantage provided by the process is not fully enjoyed. At least 20% or 30% starch provides a substantial economic advantage.

The starch may be ground cereal, e.g., grits or flour or in the form of purified starch, and the term "starch" used in the specification and claims herein is so defined. The preferred starch forms are potato starch, tapioca starch, wheat starch, or corn starch, and mixtures thereof. The preferred forms of ground cereals are wheat, corn, oats, barley and rice. While the degree of grinding of the cereal is not critical, it should be ground to a particle size consistent with ease of gelatinization thereof. Thus, conventional flour, grits, flakes and the like may be used. The particle size of these conventional ground cereals will be less than one sixteenth of an inch, and more usually less than one sixty-fourth of an inch. The preferable starch is from corn, since it is easily gelatinizable, is bland in taste, and imparts very little texture beyond the texture imparted by the animal parts.

With the starch admixed with the animal parts, effective gelatinization can occur at temperatures as low as 210° F. in the presence of appropriate moisture content. At least lower temperatures, most of the gelatinization of the feed to the extruder will be that of the starch, as opposed to gelatinization of the animal parts. As the temperature increases, an increasing proportion of the gelatinization will be by way of the animal parts. Thus, at temperatures of about 250° F. substantial gelatinization of the animal parts will occur, in addition to the gelatinization of the starch. Accordingly, at the lower temperature ranges, principally, the starch will gelatinize and a product may be produced wherein essentially only the starch is gelatinized during the extruding step. On the other hand, if higher temperatures in the extruding step are used, e.g., about 250° F. or greater, a substantial proportion of the gelatinization will be that of the animal parts. For better texture, it is preferred that a substantial proportion of the gelatinization be of the animal parts and hence, temperatures of above 250° F. in the extruding step are preferred. In all cases, however, the temperatures in the extruding step should not exceed about 350° F., and more preferably about 330° C.

By using lower ranges of temperature in the extruding step, and higher ranges of moisture, the proportion of gelatinization of the starch compared with gelatinization of the animal parts will increase. With higher proportions of gelatinization of starch and with the higher moisture contents, the extrudate will puff as it exits the extruder. This is particularly true with grinding type extruders. This puffing may or may not be to the extent required to simulate puffed pork skins and further puffing may be required. In either case the deep-fat frying temperatures and/or time for puffing will be less than the normal temperatures and/or time required for puffing of either natural pork skins or the simulated pork skins of the said copending application. This, of course, has an ecomonic advantage from a processing point of view. The fully puffed extrudate has a somewhat different texture in terms of the tenderness of the product. Thus, some frying is, neverthelss, desired, irrespective of the extruded puffed volume. The frying imparts a desired friable texture, even if performed for a short time, e.g., 5 to 15 seconds, and reduces the moisture content to the required 5% or less, although, if desired, the puffed extruded product may simply be dried, e.g., in an oven or the like, to reach the 5% moisture level and no hot oil frying is then required. The degree to which the extrudate is at least partially puffed, or puffed at all, as it exits the extruder will depend on the temperatures and the moisture content, as well as the extruder being used, and by adjustment thereof any desired degree of puffing, up to about a 3 expansion, can be achieved.

Irrespective of whether the extrudate is unpuffed but puffable or a partially puffed or fully puffed, all forms are suitable for subsequent further frying and puffing. At least a two-volume expansion is desirable to simulate a puffed natural pork skin. However, volumes greater than this can be achieved by longer puffing times or higher puffing temperatures, e.g., a volume expansion of at least 3 and up to 5 times the unpuffed volume.

As can be appreciated from the foregoing, the properties of the extrudate, as well as the properties of the subsequently puffed product, will vary with the degree of gelatinization accomplished in the extruder, as well as the proportion of starch gelatinization to animal parts gelatinization. These proportions can be adjusted by the temperatures used in the extruder, as well as the moisture content of the feed to the extruder, as explained above. In above, the particular starch and the ease of gelatinization thereof will effect these proportions. Thus, corn starch is more easily gelatinized than rice starch or wheat starch, and the use of corn starch will facilitate gelatinization of the starch. The relative ease of gelatinization of the starch. The relative ease of gelatinization of starch is well known to the art and any particular starch may be chosen consistent with the final proportions of gelatinization desired.

However, as a further control, the starch used in the process may be pregelatinized or modified starch. The degree of pregelatinization may be from very low degrees to total pregelatinization, consistent with not degrading the starch. Here again, pregelatinization is well known in the art and will not be described herein for sake of conciseness. The use of pregelatinized starch has some additional advantages. Pregelatinized starch will absorb the moisture of the feed to the extruder much more rapidly than ungelatinized starch. That absorbed moisture, being no longer free moisture, cannot vaporize during extrusion and form steam pockets in the extruder, which steam pockets can correspondingly cause surging and discontinuity of the extrudate. Further, since up to 75% of the feed to the extruder, i.e, the starch, will have already been at least partially gelatinized, the amount of gelatinization which must be accomplished in the extruder will be reduced. Hence, the residence time in the extruder can be shortened. This advantage is particularly relevant to grinding-type extruders where the residence time in the extruder is much less than in a screw-type extruder. Alternatively, the through-put through either of the extruders can be increased with the lower required residence time in the extruder. It will also be appreciated that since gelatinization requires a consumption of heat, the amount of energy in the form of heat which must be supplied to the extruder will be less. The use of pregelatinized starch, will also ensure that the extrudate which exits the extruder can be entirely, or essentially entirely, pre-puffed and that any subsequent frying need not be to the extent necessary to puff the product, but only to add additional flavor and friability, if desired. This is a considerable economic advantage to the process.

It will be appreciated that one of the effects of pregelatinization is the increased ability of the starch to rapidly take up moisture. This ability can also be achieved by modified starch, such as acid modified starch, chemical modified starch, enzyme modified starch and pre-boiled starch. Thus, modified starches may be used in the process and product. Thus, the term "starch" as used in the specification and claims is defined to embrace raw starch, pregelatinized starch and modified starch, all of which are well known to the art and need not be described herein in detail.

The invention will be illustrated by the following examples, where all parts and percentages are by weight, as is also the case in the foregoing specification and following claims, unless otherwise designated. However, the invention is not limited to the specific examples, but is fully applicable to the scope of the following disclosure and following claims.

EXAMPLE 1

Green pork skins are separated and inspected for blemishes and foreign matter. The green skins are passed through rotating discs knife blades where the skins are cut into strips of approximately 1 inch in width. The strips are then fed back through the rotating discs knives at a 90° angle to produce pellets which are approximately 1 inch by 1 inch. The pellets are dried to a moisture content of about 20%.

The dried pellets are ground in an Urschel Comtriol TM grinder using a 3-K-030-300-U blade and a 0.300 head combination. The ground particle size is such that the particles have no dimension greater than 3/16 inch. The average particle size is between about 1/16 and ⅛ inch.

The particles are placed in a Dacron TM centrifuge bag and centrifuged in a Bock TM basket-type 850 g's on the ground particles. This centrifugation causes expelling of fat from the particles and the centrifugation is continued for about thirty minutes until the fat content reaches approximately 8%.

The defatted animal parts have somewhat agglomerated in the centrifuge and after cutting with knives, grinding is again performed in the Urschel Comitrol TM with a 0.040 head. The ground parts are cooled to approximately room temperature by tumbling in a blender.

A mixture is prepared with the following composition:

| Ground and Dried Pork Skin | 47.75 |
| --- | --- |
| Corn Starch | 47.75 |
| Bacon Flavor | 1.8 |
| Salt | 1.3 |
| Hickory Smoke Flavor | 1.2 |
| Dextrose | 0.2 |

After the mixture is blended, the moisture level is determined (Ohaus TM moisture balance) and water is added to bring the moisture content to between 28.5 and 29.0%. The moisture content is again blended to ensure uniform moisture distribution and again ground in a Urschel Comitrol TM with a 0.300 head to further ensure good moisture distribution. The moisted mixture is placed in a tumble blender and blending is continued until the mixture is fed to an extruder to ensure optimum mixing and avoid any caking.

The mixture is fed to a 2¼ inch barrel size screw-type extruder (manufactured by the Bonnet Company) where the mixture is heated and pressurized to cause gelatinization. The throat section is maintained at a temperature of less than 100° F. by cooling water; the second section is maintained at a temperature of 248° F.; the third section is maintained at a temperature of 252° F.; and the last section is maintained at a temperature of 220° F. The screw is not cooled. The die is preheated by steam sparging. The product exits the extruder at approximately 220° F. The extruder is run at 50 RPM and the feed is approximately 80 lbs/hr. The extrudate passes through cooler rollers and cut into portions. The cutting of the cooled extrudate produces portions approximately 1 inch by 1 inch.

The cut portions are tumbled to keep the portions from agglomerating and ambient air is passed through the tumbler during this period. The purpose of the tumbling is simply to accumulate the portions for subsequent processing.

The portions are then passed to a hot oil dryer maintained at about 190° F. and dried for approximately 1 hour and 50 minutes until the average moisture content is reduced to approximately 10% by weight. After the portions have been dried, they are allowed to cool for about 30 minutes.

A part of the cut portions is placed in conventional plastic-lined kraft paper bags and stored for subsequent processing. Another part of the portions is placed in hot oil maintained at a temperature of about 395° F. and puffed to an expansion such that the puffed volume is three times the unpuffed volume. The product is tender, of good mouth feel and taste, and has no hard centers, is uniform in size, shape and texture, and is essentially the same as the product of said copending application.

EXAMPLE 2

The procedure of Example 1 was repeated, except that in lieu of a screw-type extruder, a grinding-type extruder was used (manufactured by the Adams Company—Bake type), and a lower moisture content was reached and then adjusted to 12% by lightly spraying the defatted particles with water. The extruder was operated at 176 RPM with the die face and the die section preheated to 300° F. The extruder was fed at a rate of 2 pounds per minute and the extrudate was cut at the die face with a revolving knife. After cutting, the extrudate puffs to about 3 times its unpuffed volume (volume in die slit).

The cut extrudate is then fried in the hot oil according to the procedure of Example 1, no further expansion takes place. The product which results is essentially the same as that of Example 1.

EXAMPLE 3

The procedure of Example 1 was repeated, serially, with the pregelatinized corn flour and modified corn starch in lieu of the corn starch of that Example. In both cases, the product which resulted was similar to the product of Example 1.

EXAMPLE 4

The procedure of Example 2 was repeated, serially, with pregelatinized corn flour, pregelatinized cornmeal, pregelatinized wheat starch, and modified cornstarch, in lieu of the cornstarch of that Example. In each case, the product which resulted was similar to the product of Example 2.

EXAMPLE 5

The part of the product of Example 1 stored in bags, was subjected to the puffing process of Example 1, after 6 months storage. The product which resulted was essentially the same as the product of Example 1.

What is claimed is:

1. In a method for producing a puffable composition containing animal parts comprising providing dried animal parts, defatting the dried animal parts to a reduced fat content, passing the defatted animal parts through an extruder at sufficiently elevated temperatures and pressures to form a moldable mass, extruding the moldable means into an extruded shape-sustaining form and cutting the form into portions thereof, the improvement comprising admixing a starch with the said animal parts, prior to said extruding step, maintaining the extruder at a temperature where the starch or the starch and animal parts are at least partially gelatinized, and cutting the extruded form into portions thereof and wherein the mixture fed to the extruder has a moisture content between 10% and 35%, a fat content of less than 15% and the weight percent of said starch, based on the mixture of starch and animal parts is from 10% to 75%.

2. The method of claim 1 wherein the percent of starch is up to 65%.

3. The method of claim 1 wherein the percent of starch is up to 55%.

4. The method of claim 1 wherein the starch is one or more of a ground cereal, potato starch and corn starch, and mixtures thereof.

5. The method of claim 1 wherein the starch is pregelatized starch or modified starch.

6. The method of claim 1 wherein the temperature of the mixture in the extruder is at least 210° F. and up to 350° F.

7. The process of claim 6 wherein the temperature is between 250° F. and 330° F.

8. The process of claim 1 wherein all of the starch is admixed with the defatted animal parts.

9. The process of claim 1 wherein all of the starch is mixed with the dried animal parts.

10. The process of claim 1 wherein the extrudate which exits the extruder is at least partially puffed.

11. The method of claim 1 or claim 10 where the portions are fried in hot oil whereby said portions are puffed.

12. The method of claim 9 wherein the defatted animal parts are comminuted prior to adding the starch.

13. The method of claim 9 wherein the animal parts are mechanically defatted at temperatures below 200° F.

14. The method of claim 13 wherein the mechanical defatting is by centrifugation.

15. The method of claim 1 wherein immediately prior to extrusion, the mixture is adjusted in moisture content to between 10% and 35%.

16. The method of claim 15 wherein the moisture content is between 25% and 35%.

17. The method of claim 16 wherein the fat content is below 12% and the mixture has a moisture content between 26% and 30% and the extrusion takes place in a screw-type extruder.

18. The method of claim 15 wherein the fat content is below 12% and the mixture has moisture contents between 11% and 13% and the extrusion is in a grinding-type extruder.

19. The method of claim 11 wherein the cut portions, prior to puffing, are dried at temperature below 240° F. and until the moisture content thereof is below 13%.

20. The method of claim 19 wherein the portions are dried in hot oil or hot air while being agitated.

21. The method of claim 1 wherein the dried animal parts are comminuted to particles having dimensions no greater than one-sixteenth of an inch.

22. The method of claim 21 wherein the particle dimensions are no greater than one sixty-fourth of an inch and the particles include ground bone of said dimensions.

23. The method of claim 1 wherein the pellets are formed into a decorative shape.

24. The method of claim 23 wherein the decorative shape is puffed.

25. An at least partially puffed or puffable composition comprising a shape-sustaining form of defatted animal parts and a starch, wherein the composition is in at least partially gelatinized form, the moisture content thereof being less than 13%, the fat content thereof being less than 15%, the starch content, in at least partially gelatinized state, being from 10% up to 75%, and the protein in said animal parts being at least in part undenatured.

26. The composition of claim 25 wherein the starch is one or more of a ground cereal, potato starch, wheat starch and corn starch.

27. The composition of claim 25 wherein the shape-sustaining form is in the form of a puffable or at least partially puffed cut portion.

28. The composition of claim 25 wherein the shape-sustaining form is in the form of a decorative shape portion.

29. The composition of claim 25 in a puffed form.

30. The composition of claim 27 or 28 in a puffed form.

31. The composition of claim 27 or 28 wherein the portions are hot oil fried portions.

32. The composition of claim 25 wherein the starch is pregelatinized starch or modified starch.

* * * * *